(12) United States Patent
Goshen et al.

(10) Patent No.: US 11,769,520 B2
(45) Date of Patent: Sep. 26, 2023

(54) COMMUNICATION ISSUE DETECTION USING EVALUATION OF MULTIPLE MACHINE LEARNING MODELS

(71) Applicant: EMC IP Holding Company LLC, Hopkinton, MA (US)

(72) Inventors: Idan Richman Goshen, Beer Sheva (IL); Shiri Gaber, Beer Sheva (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 22 days.

(21) Appl. No.: 16/995,000

(22) Filed: Aug. 17, 2020

(65) Prior Publication Data
US 2022/0051691 A1    Feb. 17, 2022

(51) Int. Cl.
*G10L 25/60* (2013.01)
*G10L 25/18* (2013.01)
*G10L 15/22* (2006.01)
*G10L 25/78* (2013.01)
*G10L 15/18* (2013.01)
G10L 15/08 (2006.01)

(52) U.S. Cl.
CPC .......... *G10L 25/60* (2013.01); *G10L 15/1815* (2013.01); *G10L 15/22* (2013.01); *G10L 25/18* (2013.01); *G10L 25/78* (2013.01); *G10L 2015/088* (2013.01)

(58) Field of Classification Search
CPC ..... G10L 25/60; G10L 15/1815; G10L 15/22; G10L 25/18; G10L 25/78; G10L 2015/088
See application file for complete search history.

(56) References Cited

U.S. PATENT DOCUMENTS 8,713,440 B2 * 4/2014 Bhattacharjee ......... H04L 67/75
    715/753
9,602,666 B2 * 3/2017 Ponting ............... H04M 3/5175
(Continued)

OTHER PUBLICATIONS https://stackabuse.com/ensemble-voting-classification-in-python-with-scikit-learn/.

(Continued)

*Primary Examiner* — Bhavesh M Mehta
*Assistant Examiner* — Nandini Subramani
(74) *Attorney, Agent, or Firm* — Ryan, Mason & Lewis, LLP

(57) ABSTRACT

Techniques are provided for evaluating multiple machine learning models to identify issues with a communication. One method comprises applying an audio signal associated with a communication to at least two of: (i) a trigger word analysis module that evaluates contextual information to determine if a trigger word is detected in the audio signal; (ii) an audio activity pattern analysis module that determines if a silence pattern anomaly is detected; and (iii) a communication application analysis module that evaluates features provided by a communication application relative to applicable thresholds; and combining results of the at least two of the trigger word analysis module, the audio activity pattern analysis module and the communication application analysis module to identify a communication issue. The combining may evaluate an accuracy of the trigger word analysis module, the audio activity pattern analysis module and/or the communication application analysis module to combine the results.

20 Claims, 10 Drawing Sheets

(56) References Cited

U.S. PATENT DOCUMENTS

| | | | | |
|---|---|---|---|---|
| 9,697,828 | B1* | 7/2017 | Prasad | G10L 15/08 |
| 10,395,220 | B2* | 8/2019 | Lopez Venegas | H04L 12/1818 |
| 10,970,485 | B1* | 4/2021 | Shi | G06F 40/289 |
| 2013/0006881 | A1* | 1/2013 | Klemm | G06Q 50/01 |
| | | | | 705/347 |
| 2015/0156598 | A1* | 6/2015 | Sun | H04N 7/147 |
| | | | | 348/14.07 |
| 2015/0195411 | A1* | 7/2015 | Krack | H04M 3/569 |
| | | | | 379/202.01 |
| 2015/0280970 | A1* | 10/2015 | Heda | H04L 12/1822 |
| | | | | 714/4.11 |
| 2016/0182727 | A1* | 6/2016 | Baran | H04M 3/568 |
| | | | | 379/88.02 |
| 2018/0096384 | A1* | 4/2018 | Carlough | G06Q 30/0246 |
| 2019/0341035 | A1* | 11/2019 | Lee | G10L 15/22 |

OTHER PUBLICATIONS

Cohen et al., "Fully Automatic Speaker Separation System, with Automatic Enrolling of Recurrent Speakers", Interspeach 2018, Sep. 2-6, 2018.

* cited by examiner

US 11,769,520 B2

COMMUNICATION ISSUE DETECTION USING EVALUATION OF MULTIPLE MACHINE LEARNING MODELS

FIELD

The field relates generally to information processing techniques, and more particularly, to the prediction of communication issues.

BACKGROUND

Telecommunication solutions used by organizations are becoming increasingly complex as employees, customers and business partners become more dispersed. Meanwhile, technical problems can be experienced that can lead to delays, frustration and increased inefficiency. Innovative solutions for maintaining a desired level of performance for a communication platform are important to enhance innovation and daily productivity of an organization, for example, in the form of improved individual and group output. In addition, the performance of an organization's communication platform can impact an image of the organization, for example, when customers and/or business partners are involved in the communications.

A need exists for techniques for improving the reliability and user experience of communication solutions.

SUMMARY

In one embodiment, a method comprises applying a representation of an audio signal associated with a communication to at least two of: (i) a trigger word analysis module that determines if one or more trigger words are detected in the audio signal from the audio signal using a trained trigger word detection model that evaluates contextual information; (ii) an audio activity pattern analysis module that determines if a silence pattern anomaly is detected in the audio signal using a trained audio activity model; and (iii) a communication application analysis module that evaluates one or more features provided by a communication application relative to one or more thresholds; combining results of the at least two of the trigger word analysis module, the audio activity pattern analysis module and the communication application analysis module to identify a communication issue for the communication; and implementing one or more remedial actions responsive to the identification of the communication issue.

In some embodiments, the combining employs an ensemble model that combines the at least two results to identify the communication issue for the communication. For example, the combining can evaluate an accuracy of each of the at least two of the trigger word analysis module, the audio activity pattern analysis module and the communication application analysis module to combine the at least two results.

Other illustrative embodiments include, without limitation, apparatus, systems, methods and computer program products comprising processor-readable storage media.

DETAILED DESCRIPTION

Figure 1:
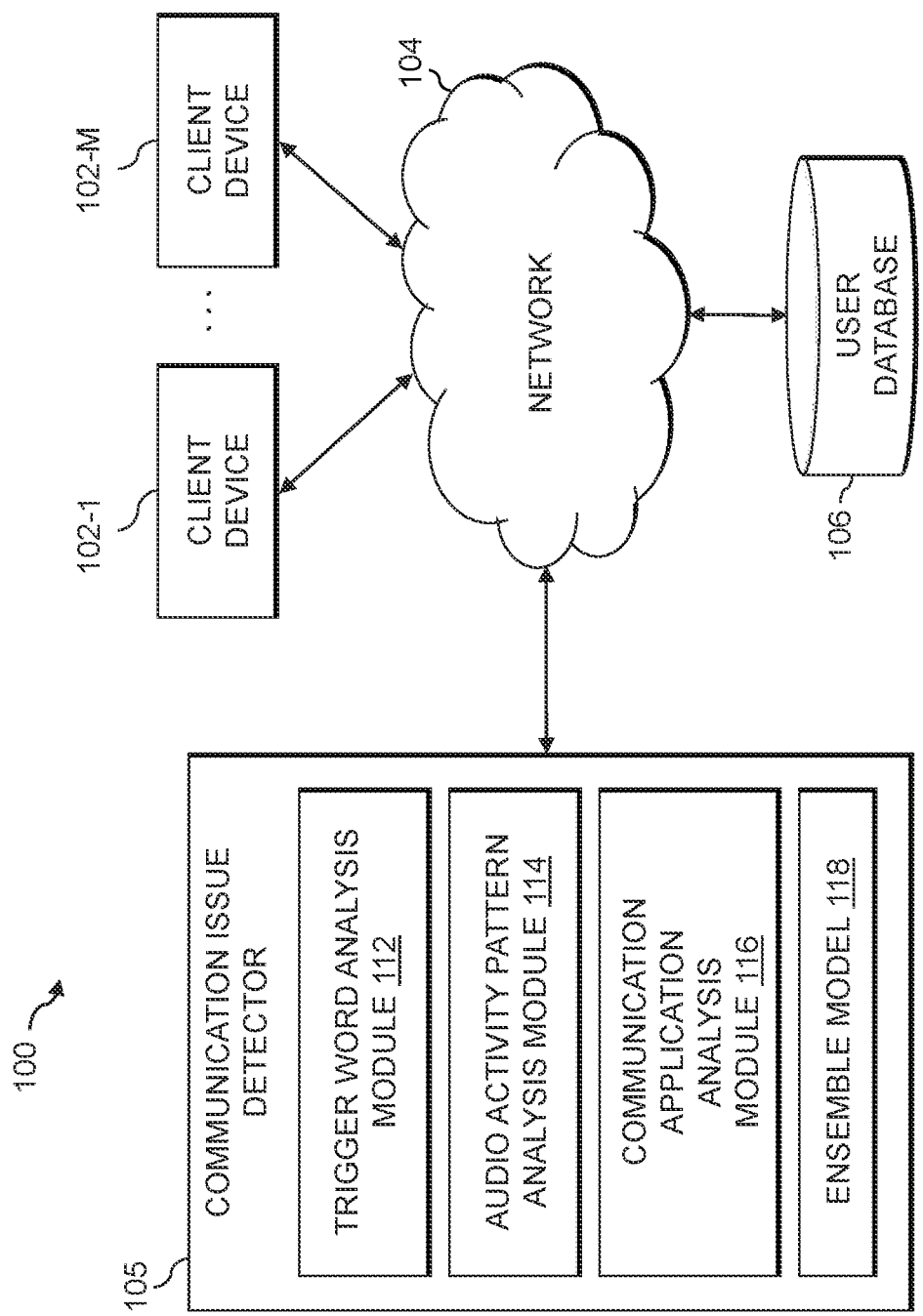
FIG. 1 shows a computer network configured to evaluate multiple machine learning models to identify issues with a communication, in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for evaluating multiple machine learning models to identify issues with a communication.

In one or more embodiments, communication issue detection techniques are provided that evaluate multiple machine learning models to identify issues with a communication. The disclosed communication issue detector detects, documents and analyzes collaboration difficulties occurring in a conference room and/or with a conference call. The multiple machine learning models identify specific sounds (or a lack of specific sounds) in the conference room and/or conference call that are indicative of communication issues. In some embodiments, alerts can be sent, for example, to an IT (information technology) department or specialist, and the incident can be documented in a centralized database. In this manner, IT departments can identify problematic conference rooms and/or conference calls, either due to faulty devices, missing peripherals or a need for training on operating the equipment. In at least some embodiments, the disclosed communication issue detector provides a standalone solution that is communication system agnostic, and can run on an edge device, such as a Raspberry Pi device.

One or more aspects of the disclosure recognize that even minor issues (such as connection or presentation issues) that are resolved within several minutes accumulate to become large expensive time periods, especially for larger organization with long working hours. In addition, some issues can be minor and relatively easy and fast to resolve (such as an unfocused projector). Many issues of this nature are solved in an ad hoc manner during a typical workday. The fact that they are solved locally by the users themselves and not propagated to IT departments and documented in a centralized database prevents a comprehensive and long-term solution and assures the reoccurrence of such issues and more wasted time and resources over time.

In at least one embodiment, the disclosed communication issue detector employs real-time inference using multiple audio detection models trained to identify several indicators of communication difficulties. The disclosed solution leverages language models in some embodiments to identify phrases indicative of an issue and/or signal processing to identify suspicious noise and signal patterns. The individual results of the multiple audio detection models are processed by an ensemble model that combines the results of the multiple models to produce a final result or prediction. Moreover, in some embodiments, the disclosed techniques can be implemented on an independent edge device placed, for example, in a conference room and "listen" to a communication using a microphone.

Data security issues can optionally be mitigated by maintaining only a small amount of audio in an audio buffer to process in real-time, for example, on the order of seconds or minutes of audio. Thus, potentially sensitive and/or private data is not saved. Such references herein to optional steps or elements should not be construed to suggest that other steps or elements are required in other embodiments.

FIG. 1 shows a computer network (also referred to herein as an information processing system) 100 configured in accordance with an illustrative embodiment. The computer network 100 comprises a plurality of client devices 102-1, 102-2, . . . 102-M, collectively referred to herein as client devices 102. The client devices 102 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is communication issue detector 105.

The client devices 102 may comprise, for example, cameras and/or sensors, as well as devices such as mobile telephones, laptop computers, tablet computers, desktop computers or other types of computing devices. Such devices are examples of what are more generally referred to herein as "processing devices." Some of these processing devices are also generally referred to herein as "computers."

The client devices 102 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The client devices 102 may comprise a network client (not shown in FIG. 1) that includes networking capabilities such as ethernet, Wi-Fi, etc.

The communication issue detector 105 comprises a trigger word analysis module 112, as discussed further below in conjunction with FIGS. 3 and 4, an audio activity pattern analysis module 114, as discussed further below in conjunction with FIG. 5, a communication application analysis module 116, as discussed further below in conjunction with FIG. 6, and an ensemble model 118, as discussed further below in conjunction with FIG. 7.

In some embodiments, the exemplary communication issue detector 105 is a standalone device that also comprises a microphone (not shown in FIG. 1), as discussed further below in conjunction with FIG. 2. In this manner, the disclosed communication issue detector 105 can process the audio signals associated with communication products from multiple different vendors and communication technologies. The disclosed solution is thus not reliant on performance logs from any specific hardware. Thus, the disclosed solution can run in any environment with little, if any, configuration.

The exemplary communication issue detector 105 may be positioned, for example, in a conference room or be associated with one or more virtual conference rooms.

As discussed further below in conjunction with FIG. 7, the outputs of the trigger word analysis module 112, the audio activity pattern analysis module 114 and the communication application analysis module 116 are processed and integrated by the ensemble model 118. In this manner, the disclosed communication issue detector 105 can provide a more confident result using a combination of two or more of the outputs of the trigger word analysis module 112, the audio activity pattern analysis module 114 and the communication application analysis module 116. For example, the output of the trigger word analysis module 112 can be validated when the audio activity pattern analysis module 114 detects a silence pattern, to avoid a false positive result.

In some embodiments, the outputs of the trigger word analysis module 112, the audio activity pattern analysis module 114 and the communication application analysis module 116 comprise a score that is compared to a corresponding threshold value.

It is to be appreciated that this particular arrangement of modules 112, 114, 116 and model 118 illustrated in the communication issue detector 105 of the FIG. 1 embodiment is presented by way of example only, and alternative arrangements can be used in other embodiments. For example, the functionality associated with modules 112, 114, 116 and model 118 in other embodiments can be combined into a single module, or separated across a larger number of modules. As another example, multiple distinct processors can be used to implement different ones of modules 112, 114, 116 and model 118 or portions thereof. At least portions of modules 112, 114, 116 and model 118 may be implemented at least in part in the form of software that is stored in memory and executed by a processor.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using interne protocol (IP) or other related communication protocols.

Additionally, the communication issue detector 105 can have an associated database 106 configured to store user data pertaining to users including preferences with respect to settings for communication applications.

The database 106 in the present embodiment is implemented using one or more storage systems associated with the communication issue detector 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the communication issue detector 105 can be one or more input-output devices, which illustratively comprise keyboards, displays or other types of input-output devices in any combination. Such input-output devices can be used, for example, to support one or more user interfaces to the communication issue detector 105, as well as to support communication between the communication issue detector 105 and other related systems and devices not explicitly shown.

The client devices 102 and the communication issue detector 105 in the FIG. 1 embodiment are assumed to be implemented using at least one processing device. Each such processing device generally comprises at least one processor and an associated memory, and implements one or more functional modules for controlling certain features of the communication issue detector 105.

More particularly, client devices 102 and communication issue detector 105 in this embodiment each can comprise a processor coupled to a memory and a network interface. The network interface allows the client devices 102 and/or the communication issue detector 105 to communicate over the network 104 with each other (as well as one or more other networked devices), and illustratively comprises one or more conventional transceivers.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

It is to be understood that the particular set of elements shown in FIG. 1 for evaluating multiple machine learning models to identify issues with a communication is presented by way of illustrative example only, and in other embodiments additional or alternative elements may be used. Thus, another embodiment includes additional or alternative systems, devices and other network entities, as well as different arrangements of modules and other components.

An exemplary process utilizing at least some of modules 112, 114, 116 and model 118 of an example communication issue detector 105 in computer network 100 will be described in more detail with reference to the flow diagram of FIG. 8.

One or more embodiments include utilizing multiple distinct machine learning models in conjunction with multiple hardware and/or software components across a framework of an organization to predict issues with a particular communication. The machine learning model used to generate such predictions can include, for example, at least one ensemble-based model, which can be implemented to determine one or more classifications. The specific model can be chosen, for example, based at least in part on the dimensionality and complexity of the data attributes in question. Further, in at least one embodiment, historical data is utilized to train such models for accuracy.

Figure 2:
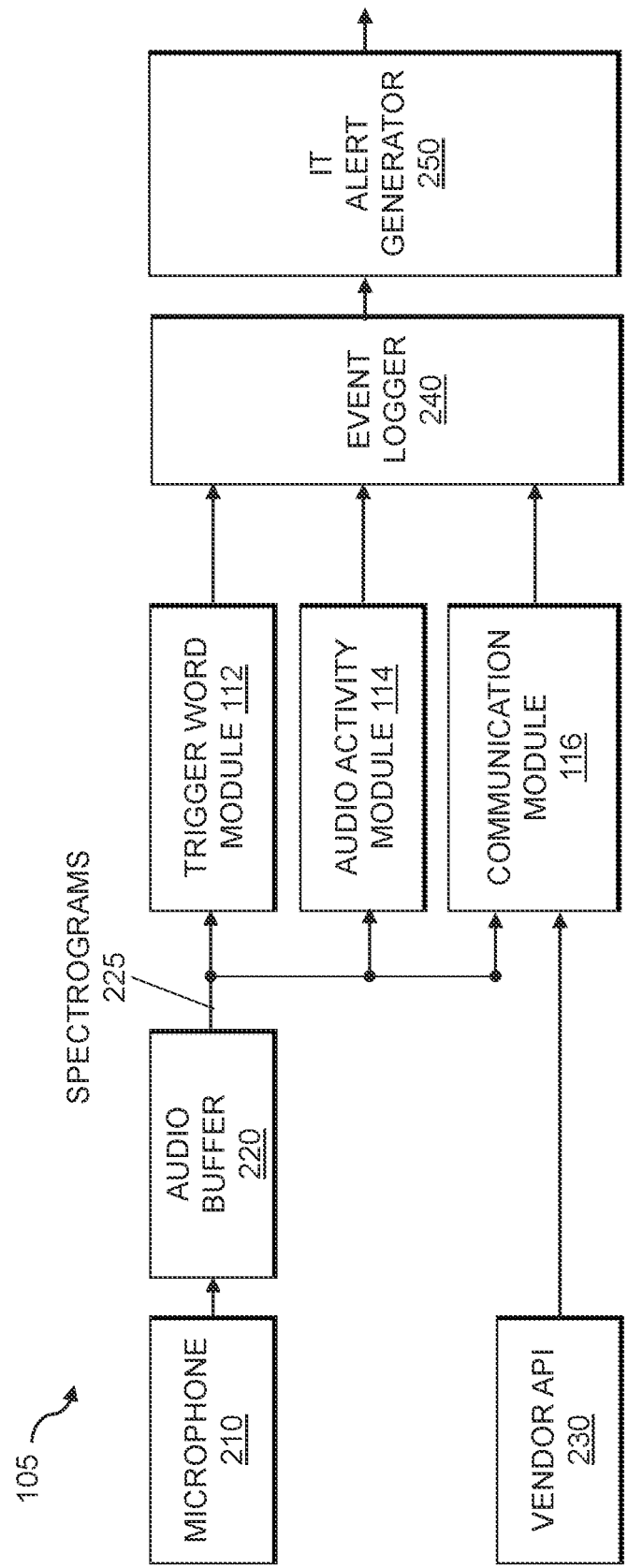
FIG. 2 illustrates the communication issue detector of FIG. 1 in further detail, according to at least one embodiment of the disclosure.

FIG. 2 illustrates the communication issue detector 105 of FIG. 1 in further detail, according to at least one embodiment of the disclosure. As noted above, the exemplary communication issue detector 105 may be a standalone device positioned, for example, in a conference room or another location where remote communications are conducted and/or monitored. As shown in FIG. 2, a microphone 210 associated with the communication issue detector 105 receives an audio signal associated with a conference call. In this manner, the microphone 210 can detect audio signals from one or more external communication devices associated with potentially multiple vendors.

The audio signal generated by the microphone 210 is applied to an audio buffer 220, which provides a representation of the audio signal in the form of one or more spectrograms 225. The spectrograms 225 are processed by the trigger word analysis module 112, discussed further below in conjunction with FIGS. 3 and 4, the audio activity pattern analysis module 114, as discussed further below in conjunction with FIG. 5, and the communication application analysis module 116, discussed further below in conjunction with FIG. 6. Generally, a spectrogram is a visual representation of a spectrum of frequencies of a signal as the signal varies over time (sometimes also referred to as voiceprints, sonographs, or voicegrams).

As shown in FIG. 2 and as discussed further below, the exemplary communication application analysis module 116 also processes signals generated by a vendor application programming interface (API) 230 associated with a particular third-party communication application or product, such as the Skype telecommunications application, provided by Microsoft Corporation and/or the Zoom telecommunications application, provided by Zoom Video Communications, Inc. In at least some embodiments, the exemplary communication application analysis module 116 is provided by a third-party, relative to a provider of the communication issue detector 105.

In the example of FIG. 2, the modules 112, 114, 116 execute in parallel and each module 112, 114, 116 triggers a log event, when appropriate, that is processed by an event logger 240. The event logger 240 logs, for example, the device name, time, and trigger event, for later analysis by an IT specialist. Moreover, a log event can act as a real-time alert for an information technology (IT) department and/or specialist, enabling them in some embodiments to engage with the conference participants in order to help them solve the occurring issue. In addition, the collection of log data enables the generation of statistics on accumulating inefficiencies. The data can optionally be displayed to managers and/or specialists with use of business intelligence tools and dashboards, which can lead to improvements in daily working methods and culture.

An IT alert generator 250 can generate alerts that can prevent further escalations of communication issues. In some embodiments, discussed further below, the IT alert generator 250 or another module can perform additional or alternative remedial actions.

In some embodiments, the event logger 240 and/or the IT alert generator 250 may implement at least portions of the ensemble model 118 of FIG. 1 that combines the individual results of modules 112, 114, 116.

In this manner, the disclosed communication issue detector 105 automatically raises awareness to IT issues that may disrupt daily efficacy, thereby saving valuable time and resources for large organizations. IT professionals and managers can gain a direct view into daily issues occurring in the meeting rooms and on conference calls. This visibility allows IT personnel to have control and make informed decisions as to the company's daily conduct and priorities for the communications of an organization.

To improve the accuracy and avoid false positives, feedback concerning the quality of the call is collected from participants at the end of each meeting. Participants can be asked in at least some embodiments to give a score to the meeting hardware performance and/or to the communication services, for example, in a range between 1-5, where a rating of 5 may correspond, for example, to a "perfect call" and a rating of 1 may indicate multiple communication issues that highly disrupted the fluency and productivity of the meeting. In this manner, the accuracy of the solution is enhanced with time. In addition, the ratings can be used to train the machine learning models using supervised learning techniques, as discussed further below in conjunction with FIG. 4.

Figure 3:
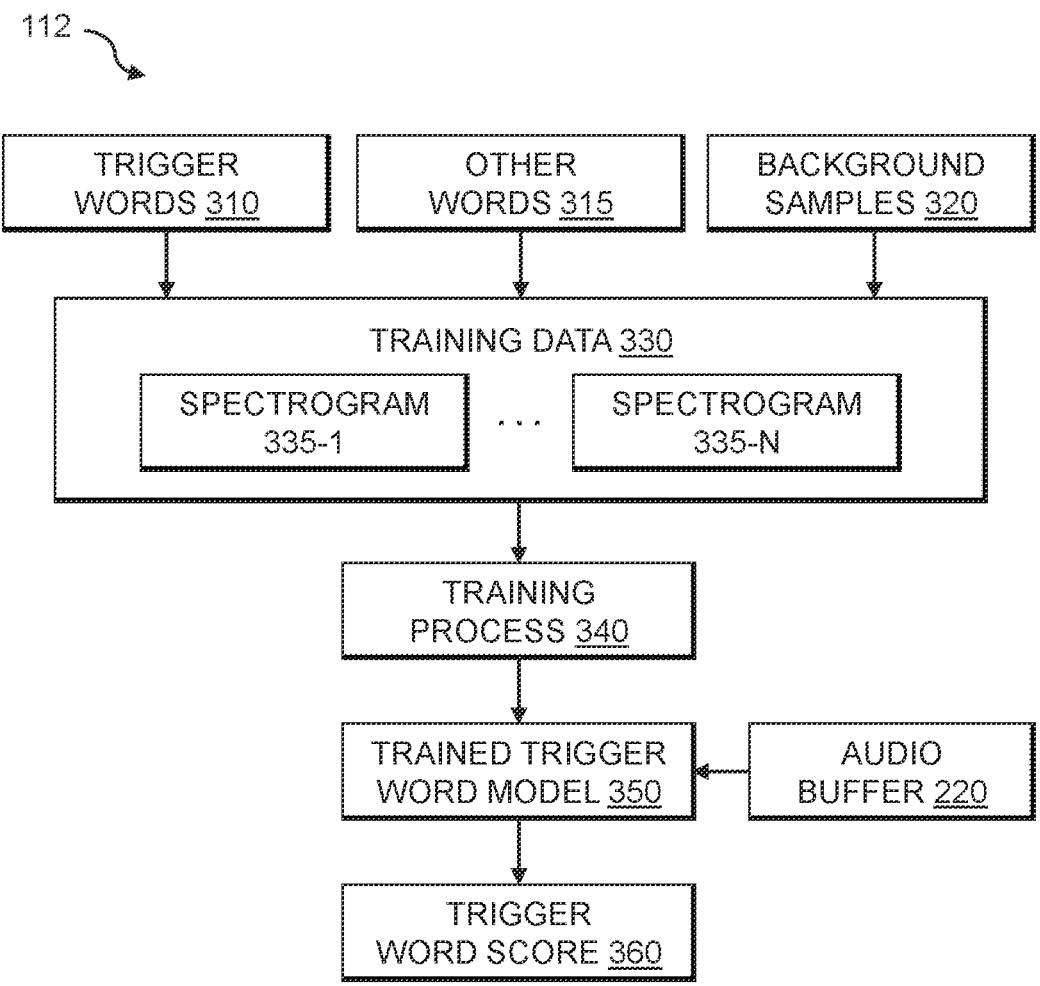
FIGS. 3 and 4 illustrate the trigger word analysis module of FIG. 1 in further detail, according to some embodiments.

FIG. 3 illustrates the trigger word analysis module 112 of FIG. 1 in further detail, according to some embodiments. In the implementation of FIG. 3, the trigger word analysis module 112 operates in a training mode by processing audible samples of a set of trigger words 310, a set of other words 315 and a set of background samples 320 (e.g., noise and ambient sounds, to simulate regular office sounds, such as chatter, fan noise and footsteps), as a set of training data 330. The training data 330 is represented in the example of FIG. 3 as spectrograms 335-1 through 335-N.

A training process 340 processes the training data 330 to generate a trained trigger word model 350, using known supervised learning techniques, as discussed further below in conjunction with FIG. 4. In one or more embodiments, the exemplary trained trigger word model 350 employs deep learning-based language models to identify significant words or phrases such as "equipment", "working," "issue," "IT" and more.

In some embodiments, the training process 340 trains a neural network comprising several convolutional layers and recurrent layers (e.g., Gated Recurrent Units (GRU) and Long Short-Term Memory (LSTM)) that processes an image representation of recorded audio (e.g., a mel spectrogram, where the frequencies of a spectrogram are converted to the mel scale) and determines whether that audio contains one or more target words in the set of trigger words 310.

The training process 340, in the model training phase, trains the trained trigger word model 350 on recordings of the target words in the set of trigger words 310, either by using existing multi-speaker audio corpus (such as the VCTK corpus or the LibriSpeech corpus), or by manually recording them and using data augmentation methods to broaden the sample size. For phrases (e.g., longer than one word), the exact phrase can be found in one of the corpuses, or each word can be found separately in the corpus and the corresponding audio waves can be concatenated.

In the implementation of FIG. 3, the trigger word analysis module 112 operates in a classification mode by processing real-time audio signals from the audio buffer 220. The audio signals are represented in the illustrative embodiment as spectrograms and are applied to the trained trigger word model 350 which generates a score indicating a likelihood that a communication issue is detected.

The example of FIG. 3 employs the set of other words 315 to perform context-based identification of trigger words and/or trigger phrases. A list of target words and/or phrases are developed to form the set of trigger words 310, list of target words and/or phrases comprise those words or phrases that imply that something is wrong with the communication, such as "not working," "try this," and "I am trying."

The trained trigger word model 350 that has been trained for a given set of trigger words can be installed on the communication issue detector 105, for example, implemented as an edge device. The trained trigger word model 350 can process the audio signals and perform inference of the real-time audio input to detect the set of trigger words 310. The trained trigger word model 350 can generate a trigger word score 360 indicating a likelihood or confidence that a trigger word was detected. In some embodiments, the trained trigger word model 350 can raise a flag that a trigger word was detected when the trigger word score 360 exceeds a defined threshold.

One or more aspects of the disclosure recognize that the context of the trigger words also needs to be considered, since many words can be used in a regular meeting context, such as "issue," "not working" and more that may not indicate a communication issue. As discussed further below in conjunction with FIG. 4, the context can include (i) other trigger words raised in the vicinity of a given trigger word, (ii) a timing in the meeting in which informative terms are mentioned, (iii) whether the occurrence of a trigger word is before or after detected silence patterns, and (iv) a meeting score feedback collected from users (e.g., the ratings discussed above).

In some embodiments, the disclosed communication issue detector 105 distinguishes between communication issues detected in a local location of the communication issue detector 105 (e.g., the room where the communication issue detector 105 is installed) and communication issues detected in a remote location. For example, the communication issue detector 105 may be configured to ignore communication issues detected in a remote location.

Thus, in some embodiments, the exemplary communication issue detector 105 determines whether the speaker is in the local conference room, for example, and not in a remote location. Speaker identification techniques may be employed. For example, whether a person is present in the local room or the audio signal is coming from the room speakers can be classified using known techniques. In some implementations, the communication issue detector 105 can prioritize local issues over remote issues.

Figure 4:
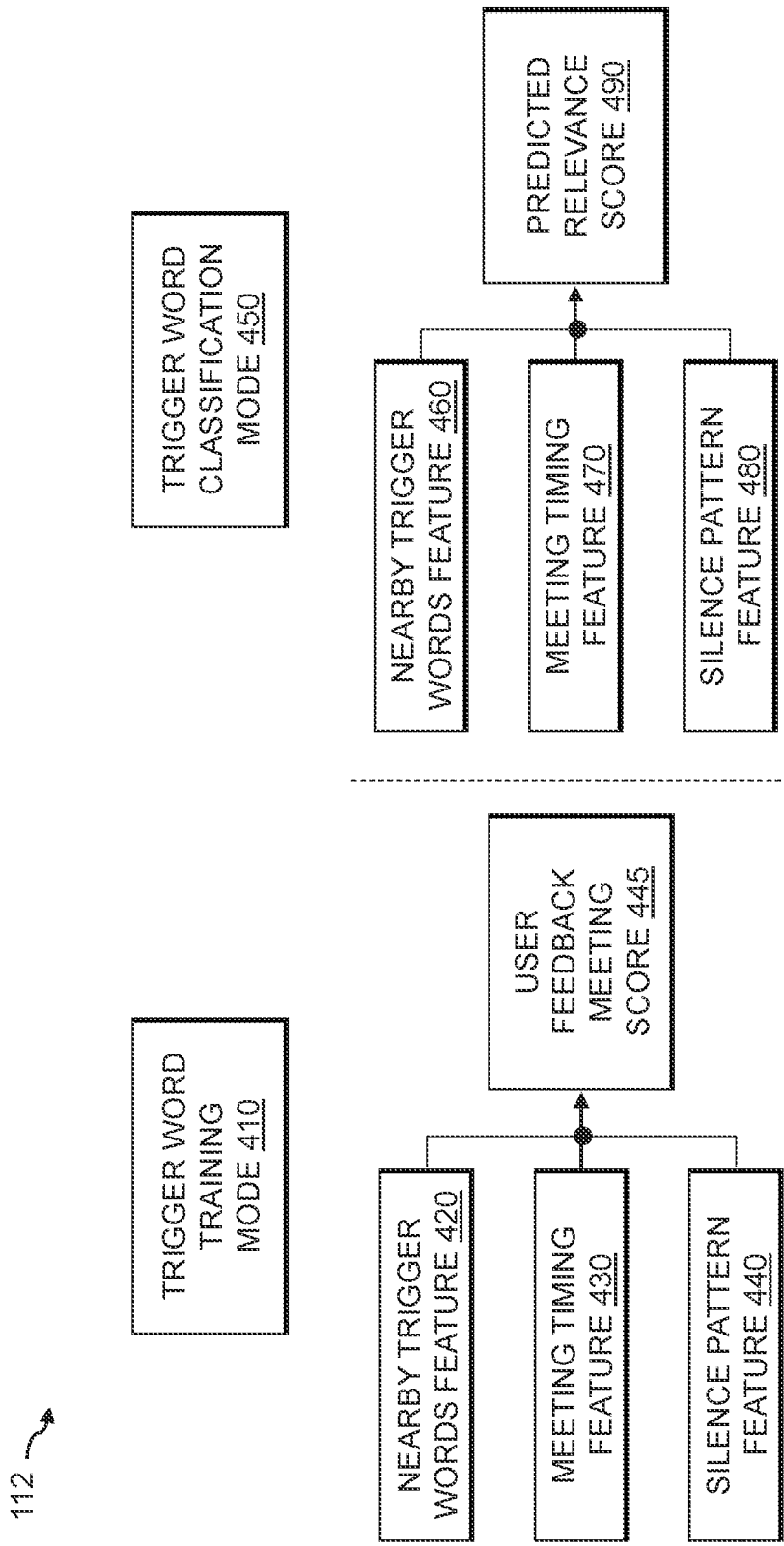

FIG. 4 illustrates the trigger word analysis module 112 of FIGS. 1 and 3 in further detail, according to at least one embodiment. As shown in FIG. 4, and as noted above, the trigger word analysis module 112 operates in a trigger word training mode 410 and a trigger word classification mode 450.

As discussed further below in conjunction with FIG. 4, the trigger word training mode 410 can learn the context of trigger words by evaluating (i) a feature 420 indicating other nearby trigger words that were raised in the vicinity of a given trigger word, (ii) a feature 430 indicating a timing in the meeting in which informative terms are mentioned, and (iii) a feature 440 indicating whether the occurrence of a trigger word is before or after detected silence patterns. In addition, the trigger word training mode 410 can learn the context of trigger words by evaluating and the meeting score feedback 445 collected from users (e.g., the ratings discussed above).

The feature 440 indicating whether the occurrence of a trigger word is before or after detected silence patterns can be generated, for example, based on the output of the audio activity pattern analysis module 114 to evaluate the context of trigger words.

The trigger word classification mode 450 performs the real-time classification to determine the likelihood that a trigger word indicating a communication issue is detected in the audio signal. As shown in FIG. 4, the trigger word classification mode 450 also processes, in real-time, (i) feature 460 indicating other nearby trigger words that were raised in the vicinity of a given trigger word, (ii) feature 470 indicating a timing in the meeting in which informative terms are mentioned, and (iii) feature 480 indicating whether the occurrence of a trigger word is before or after detected silence patterns, in a similar manner as the trigger word training mode 410.

The trigger word classification mode 450 generates a predicted relevance score 490 indicating a likelihood or confidence that a trigger word (or phrase) indicating a communication issue is detected in the audio signal.

Figure 5:
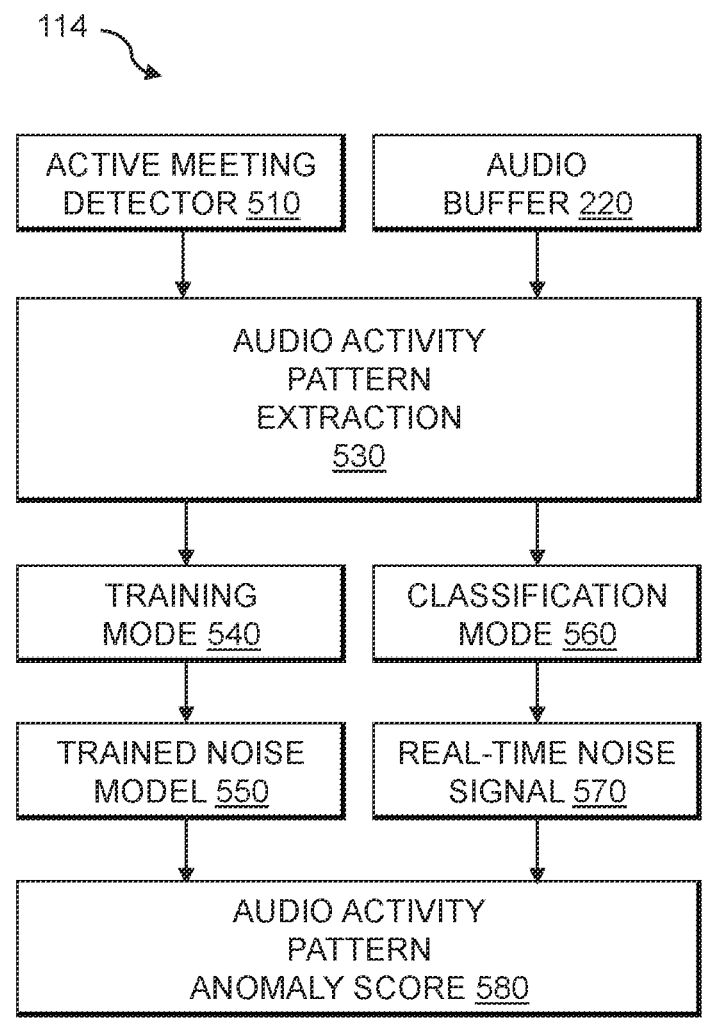
FIG. 5 illustrates the audio activity pattern analysis module of FIG. 1 in further detail, according to one or more embodiments of the disclosure.

FIG. 5 illustrates the audio activity pattern analysis module 114 of FIG. 1 in further detail, according to one or more embodiments of the disclosure. One or more aspects of the disclosure recognize that meetings undergoing technical difficulties are usually characterized with relatively long silence periods in which participants are trying to fix the communication problem.

As shown in FIG. 5, the exemplary audio activity pattern analysis module 114 comprises an active meeting detector 510 that can determine when a meeting is active. For example, the active meeting detector 510 may have a connection to a conference room calendar in order to know when meetings are scheduled to start (e.g., system agnostic). In other variations, the active meeting detector 510 can monitor user log-ins to meeting applications (e.g., the Skype telecommunications application and/or the Zoom telecommunications application, referenced above), audible activity in the meeting room, and/or physical activity in the meeting room. In addition, the exemplary audio activity pattern analysis module 114 also processes the spectrogram representations, for example, obtained from the audio buffer 220.

The signal from the active meeting detector 510 and the contents of the audio buffer 220 are processed by an audio activity pattern extraction module 530 that measures an amplitude of the audio signals to identify periods of silence and periods of conversation or other audio activity (e.g., noise) when a meeting or conference call is active.

In the example of FIG. 5, the output of the audio activity pattern extraction module 530 is processed in a training mode 540 to generate a trained noise model 550, for example, using the supervised learning techniques referenced above.

Likewise, the output of the audio activity pattern extraction module 530 is processed in a classification mode 560 to evaluate a real-time noise signal 570, using the trained noise model 550, to generate an audio activity pattern anomaly score 580 indicating a likelihood or confidence that a silence pattern anomaly is detected. As used herein, a silence pattern anomaly and/or the term "silence" do not require silence in an absolute sense, but rather, a deviation from an expected amount of audible audio activity.

Generally, in the classification mode 560, a length distribution vector of noise periods and silence periods are evaluated and compared to historical samples of noise/silence patterns corresponding to known good and bad communication sessions. A significant deviation from a desired pattern will invoke a log event. For example, in the classification mode 560, the real-time noise signal 570 is compared by the trained noise model 550 to historical examples of noise/silence patterns corresponding to known good and bad communication sessions (for example, trained using a similar rating between a range of 1-5, as discussed above for the trigger word analysis module 112).

In one or more embodiments, one or more of the models associated with each of the trigger word analysis module 112, audio activity pattern analysis module 114 and communication application analysis module 116 can be used to train other models of the modules 112, 114 and 116. For example, a baseline for noise-silence patterns can be constructed using data collected in an initial training period while relying on the other modules 112 and 116 for labeling. In this manner, each audio activity pattern analysis module 114 can learn the unique (yet similar) patterns of the associated conference room. Deep learning models for sound classification can be employed to automatically identify silent periods, for example, at the beginning of a meeting.

Figure 6:
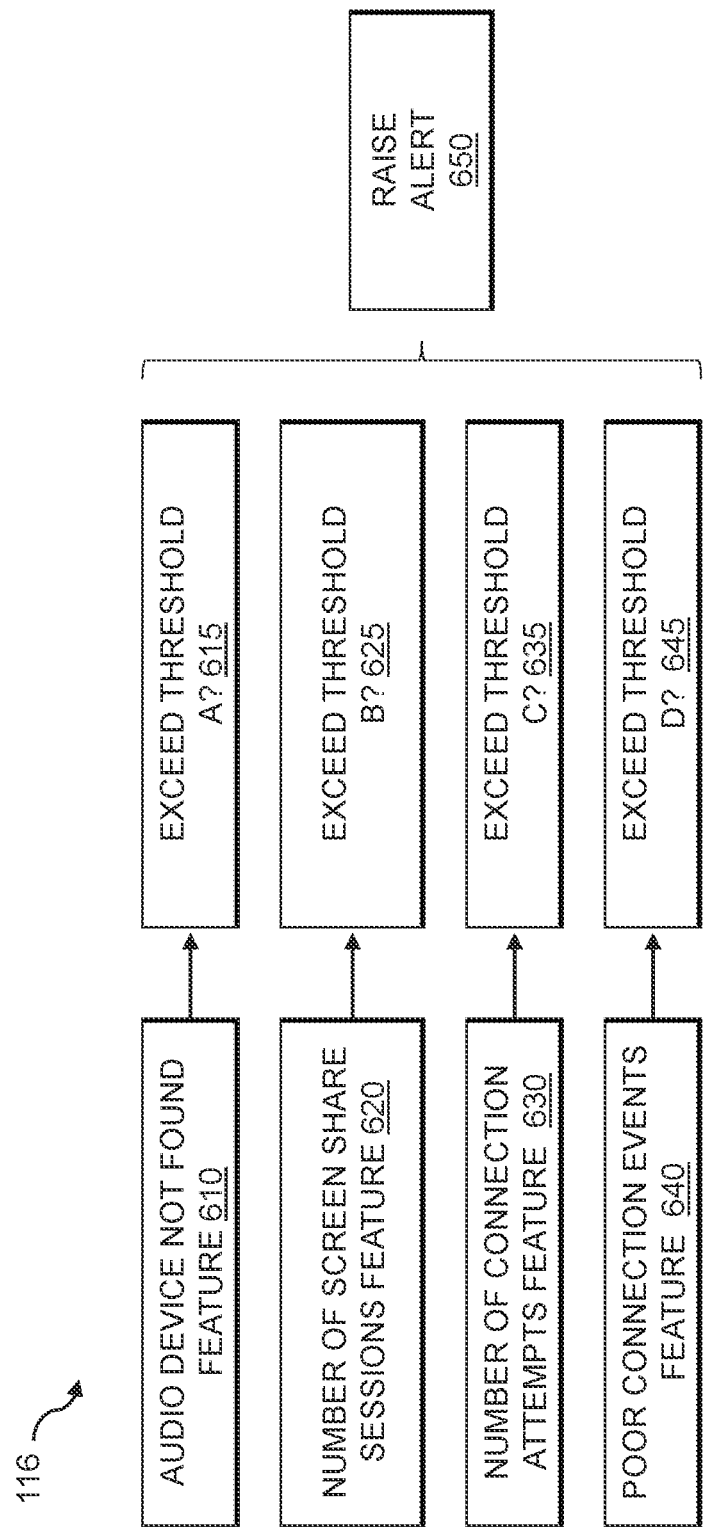
FIG. 6 illustrates the communication application analysis module of FIG. 1 in further detail, according to an embodiment of the disclosure.

FIG. 6 illustrates the communication application analysis module 116 of FIG. 1 in further detail, according to an embodiment of the disclosure. As discussed above in conjunction with FIG. 2, the exemplary communication application analysis module 116 processes audio signals from the audio buffer 220 and/or one or more signals generated by the vendor API 230 associated with a particular third-party communication application or product (e.g., the Skype telecommunications application and/or the Zoom telecommunications application, referenced above).

In the example of FIG. 6, the exemplary communication application analysis module 116 processes a number of exemplary features 610, 620, 630, 640 based on the audio signals from the audio buffer 220 and/or the signals generated by the vendor API 230. For example, the exemplary features comprise: (i) an audio device not found feature 610, indicating whether an audio device, such as a speaker or microphone is present; (ii) a number of screen share sessions feature 620 indicating a number of screen shares during a meeting or conference call, (iii) a number of connection attempts feature 630 indicating a number of times a connection was attempted (e.g., repeated attempts), and (iv) a poor connection events feature 640 indicating a number of detected "poor connections," for example, based on defined call quality criteria, during a meeting or conference call.

The number of connection attempts feature 630, for example, can indicate problems related to audio issues, share screen issues, video issues and/or a bad connection. The number of connection attempts feature 630 can be provided by the vendor API 230, or by detecting audio strings associated with specific connection attempts, such as "please enter conference identifier" or a distinctive "calling" tone associated with a particular third-party communication application product. In the latter case, audio detection is done in a similar manner as in the trigger word analysis module 112. Connection attempts can be logged and enable an IT professional to analyze a number of connection attempts in a given conference room, for example, per meeting (or any other metric that will evaluate the technical inefficiency of a given room or conference call).

As shown in FIG. 2, each of the exemplary features 610, 620, 630, 640 are compared to corresponding thresholds A through D (615, 625, 635, 645, respectively). The corresponding thresholds A through D can be established, for example, by IT professionals or other users. When a given threshold is satisfied (e.g., exceeded), a corresponding alert 650 is raised. In some embodiments, a score can be generated indicating a likelihood or confidence that a communication is present that is related to a third-party communication application. For example, the likelihood score can be a combination of the individual results based on the exemplary features 610, 620, 630, 640.

Figure 7:
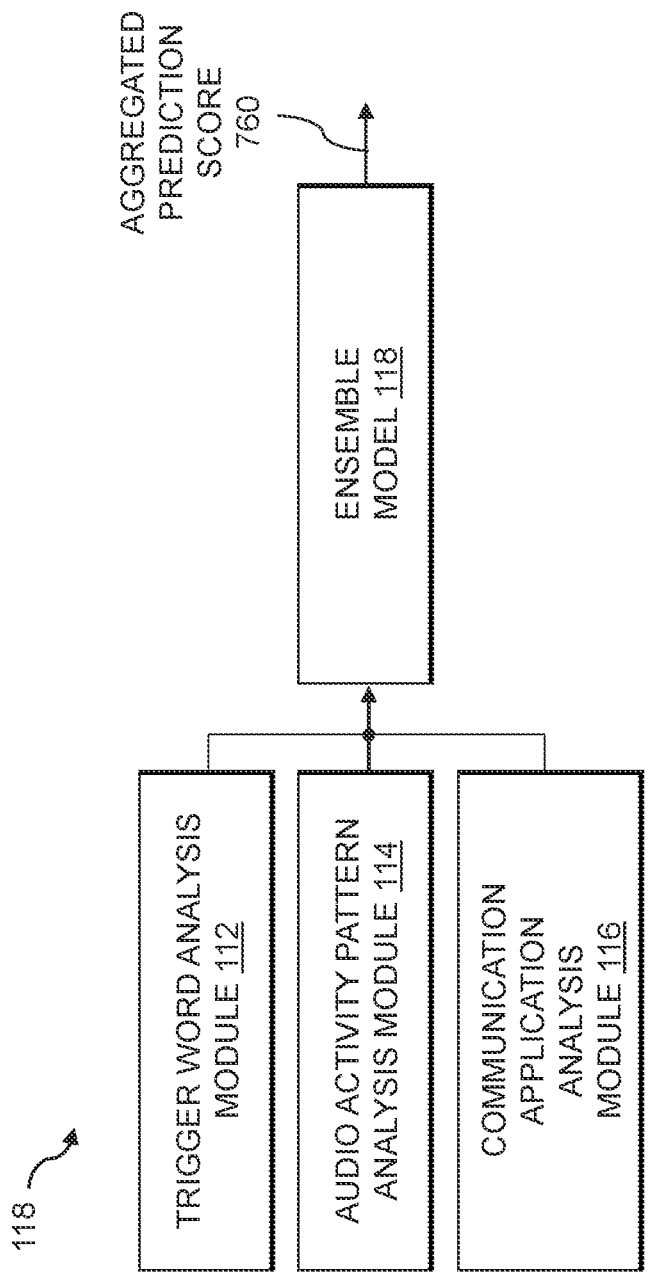
FIG. 7 illustrates an exemplary ensemble model that processes the results generated by the multiple machine learning models to determine an aggregated prediction, according to at least some embodiments.

FIG. 7 illustrates an exemplary ensemble model 118 that processes the results generated by the multiple machine learning models to determine an aggregated prediction, according to at least some embodiments. As shown in FIG. 7, the exemplary ensemble model 118 processes the individual outputs (e.g., likelihood scores and corresponding performance or accuracy indicators for each module) of at least two of the trigger word analysis module 112, the audio activity pattern analysis module 114, and the communication application analysis module 116 to combine the individual results and determine an aggregated prediction score 760.

In some embodiments, the ensemble model 118 employs ensemble learning and is implemented as a stacking ensemble model that learns to best combine the contributions from each module 112, 114, 116. See, for example, Dan Nelson, Stacking, Ensemble/Voting Classification in Python with Scikit-Learn (article on stack abuse web site), incorporated by reference herein in its entirety. The stacking ensemble model employs a stacking approach that can result in better predictive performance than any single contributing model in the modules 112, 114, 116 as well as a single "source of truth" for operators to act upon. The ensemble model 118 may employ, for example, "bagging," "boosting" and/or "bucket of models" techniques.

Figure 8:
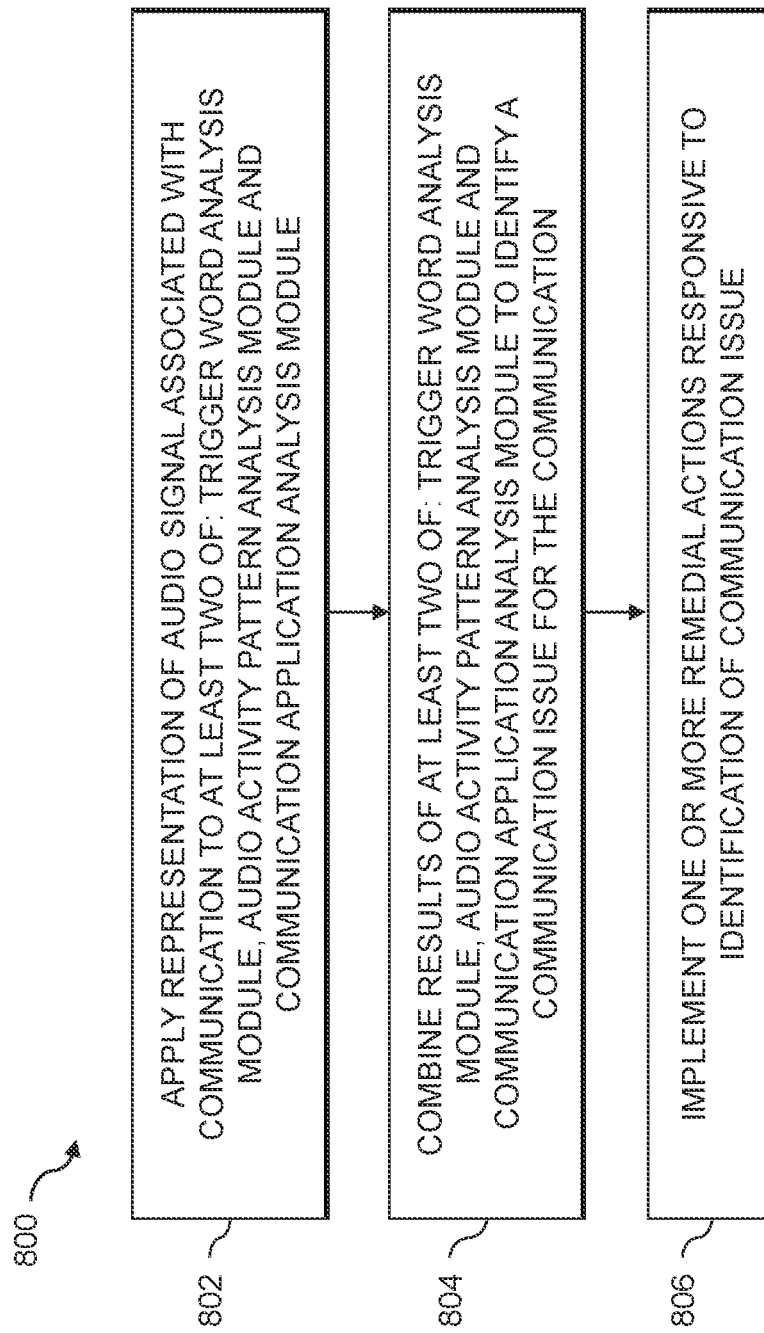
FIG. 8 is a flow chart illustrating an exemplary implementation of a communication issue detection process, according to one embodiment of the disclosure.

FIG. 8 is a flow chart illustrating an exemplary implementation of a communication issue detection process 800, according to one embodiment of the disclosure. As shown in FIG. 8, the exemplary communication issue detection process 800 initially applies a representation of one or more audio signal associated with a communication during step 802 to at least two of: the trigger word analysis module 112, the audio activity pattern analysis module 114 and the communication application analysis module 116.

The communication issue detection process 800 then combines the results of at least two of: the trigger word analysis module 112, the audio activity audio activity pattern analysis module 114 and the communication application analysis module 116 during step 804 (for example, using the ensemble model 118) to identify a communication issue for the communication. As noted above, in some embodiments, the ensemble model 118 generates an aggregate prediction score 760.

Finally, the communication issue detection process 800 implements one or more remedial actions during step 806 responsive to the combining identifying a communication issue for the communication. For example, a communication issue for the communication can be declared when the aggregate prediction score 760 exceeds a defined threshold. The remedial actions performed during step 806 to address the detected communication issue(s) can include, for example, generating an alert and/or collecting logs of the event, and/or notifying one or more third-party communication systems (such as sending an email, or generating an alert in another system).

In some embodiments, alerts or notifications generated by a communication issue detector 105 are provided over network 104, for example, to client devices 102, or to a system administrator, IT manager, or other authorized personnel via one or more host agents. Such host agents may be implemented via the client devices 102 or by other computing or processing devices associated with a system administrator, IT manager or other authorized personnel.

In one or more embodiments, the remedial actions performed during step 806 can depend on the nature of the detected communication issue, and can include, for example, presenting an issue-specific troubleshooting guide to a user, or specific actions to perform to address the detected issue, such as resetting one or more devices associated with the communication.

The particular processing operations and other network functionality described in conjunction with the flow diagram of FIG. 8 are presented by way of illustrative example only, and should not be construed as limiting the scope of the disclosure in any way. Alternative embodiments can use other types of processing operations to detect communication issues using the disclosed multiple machine learning model techniques. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

Among other benefits, in some embodiments, the disclosed techniques for evaluating multiple machine learning models to identify issues with a communication aim to mitigate or reduce the time wasted by IT issues that occur, for example, on a daily basis and to automatically document them in a centralized database, for example, to improve company policies and communication resources. One or more embodiments of the disclosure provide improved methods, apparatus and computer program products for evaluating multiple machine learning models to identify issues with a communication. The foregoing applications and associated embodiments should be considered as illustrative only, and numerous other embodiments can be configured using the techniques disclosed herein, in a wide variety of different applications.

It should also be understood that the disclosed multi-model communication issue prediction techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed techniques for evaluating multiple machine learning models to identify issues with a communication may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments.

Also, the particular types of information processing system features and functionality as illustrated and described herein are exemplary only, and numerous other arrangements may be used in other embodiments.

In these and other embodiments, compute services can be offered to cloud infrastructure tenants or other system users as a Platform-as-a-Service (PaaS) offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based communication issue detector, or portions thereof, are illustratively implemented for use by tenants of such a multi-tenant environment.

Cloud infrastructure as disclosed herein can include cloud-based systems such as Amazon Web Services (AWS), Google Cloud Platform (GCP) and Microsoft Azure. Virtual machines provided in such systems can be used to implement at least portions of a cloud-based communication issue detection platform in illustrative embodiments. The cloud-based systems can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9 and 10. These platforms may also be used to implement at least portions of other information processing systems in other embodiments.

Figure 9:
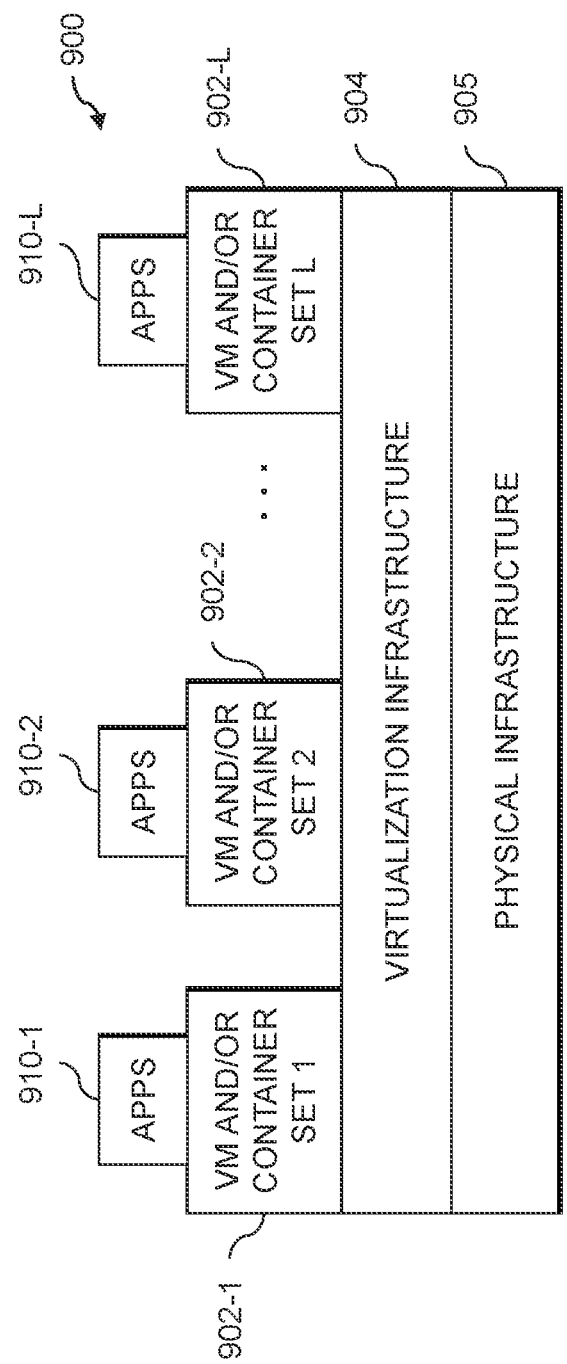
FIG. 9 illustrates an exemplary processing platform that may be used to implement at least a portion of one or more embodiments of the disclosure comprising a cloud infrastructure.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises multiple virtual machines (VMs) and/or container sets 902-1, 902-2, . . . 902-L implemented using virtualization infrastructure 904. The virtualization infrastructure 904 runs on physical infrastructure 905, and illustratively comprises one or more hypervisors and/or operating system level virtualization infrastructure. The operating system level virtualization infrastructure illustratively comprises kernel control groups of a Linux operating system or other type of operating system.

The cloud infrastructure 900 further comprises sets of applications 910-1, 910-2, . . . 910-L running on respective ones of the VMs/container sets 902-1, 902-2, . . . 902-L under the control of the virtualization infrastructure 904. The VMs/container sets 902 may comprise respective VMs, respective sets of one or more containers, or respective sets of one or more containers running in VMs.

In some implementations of the FIG. 9 embodiment, the VMs/container sets 902 comprise respective VMs implemented using virtualization infrastructure 904 that comprises at least one hypervisor. Such implementations can provide multi-model communication issue prediction functionality of the type described above for one or more processes running on a given one of the VMs. For example, each of the VMs can implement multi-model communication issue prediction control logic and associated ensemble models for providing communication issue detection functionality for one or more processes running on that particular VM.

An example of a hypervisor platform that may be used to implement a hypervisor within the virtualization infrastructure 904 is the VMware® vSphere® which may have an associated virtual infrastructure management system such as the VMware® vCenter™. The underlying physical machines may comprise one or more distributed processing platforms that include one or more storage systems.

In other implementations of the FIG. 9 embodiment, the VMs/container sets 902 comprise respective containers implemented using virtualization infrastructure 904 that provides operating system level virtualization functionality, such as support for Docker containers running on bare metal hosts, or Docker containers running on VMs. The containers are illustratively implemented using respective kernel control groups of the operating system. Such implementations can provide communication issue detection functionality of the type described above for one or more processes running on different ones of the containers. For example, a container host device supporting multiple containers of one or more container sets can implement one or more instances of multi-model communication issue prediction control logic and associated ensemble models for use in detecting communication issues.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises at least a portion of the given system and includes a plurality of processing devices, denoted 1002-1, 1002-2, 1002-3, . . . 1002-K, which communicate with one another over a network 1004. The network 1004 may comprise any type of network, such as a wireless area network (WAN), a local area network (LAN), a satellite network, a telephone or cable network, a cellular network, a wireless network such as WiFi or WiMAX, or various portions or combinations of these and other types of networks.

The processing device 1002-1 in the processing platform 1000 comprises a processor 1010 coupled to a memory 1012. The processor 1010 may comprise a microprocessor, a microcontroller, an ASIC, a FPGA or other type of processing circuitry, as well as portions or combinations of such circuitry elements, and the memory 1012, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and the given system may include additional or alternative processing platforms, as well as numerous distinct processing platforms in any combination, with each such platform comprising one or more computers, storage devices or other processing devices.

Figure 10:
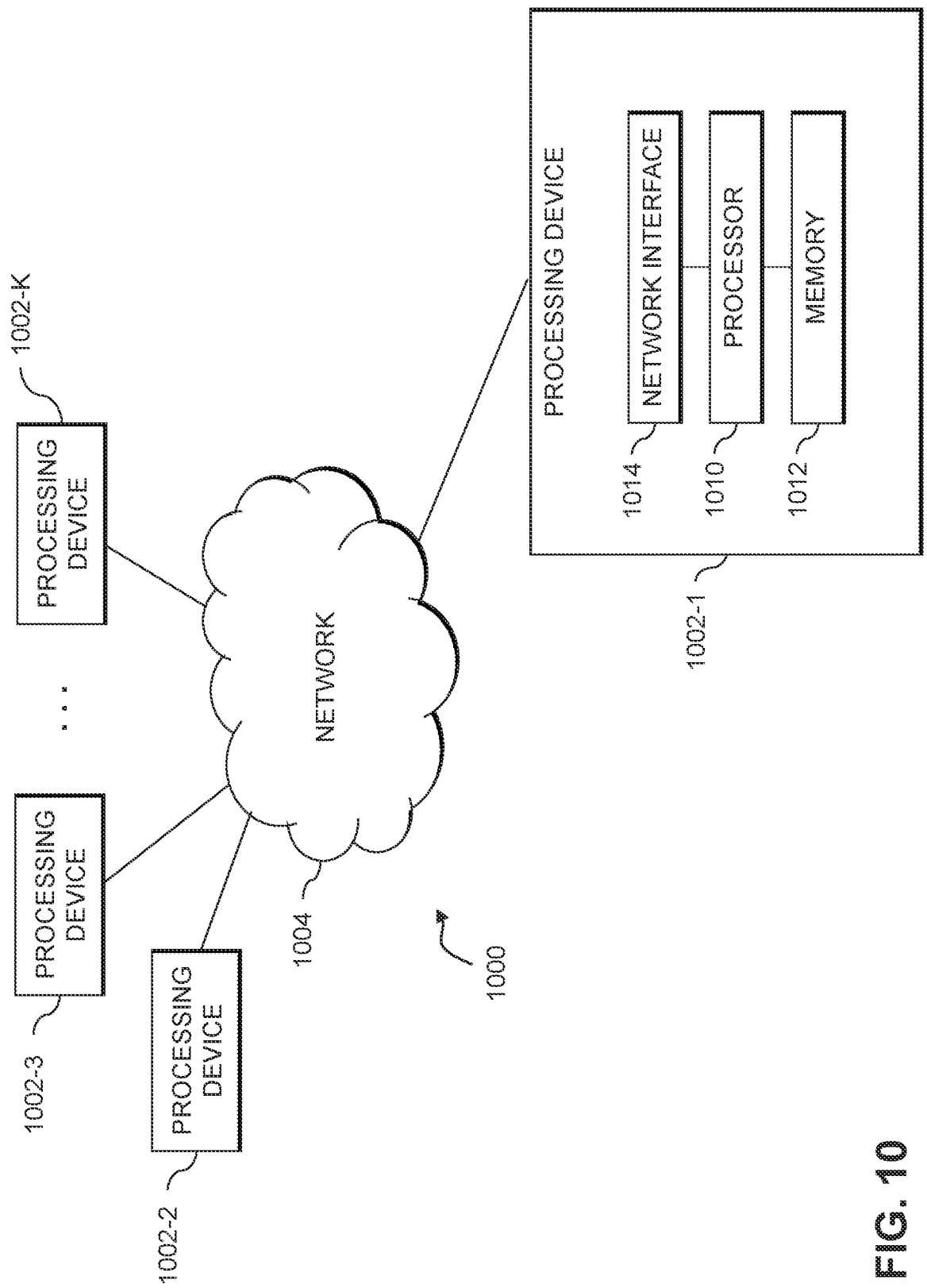
FIG. 10 illustrates another exemplary processing platform that may be used to implement at least a portion of one or more embodiments of the disclosure.

Multiple elements of an information processing system may be collectively implemented on a common processing platform of the type shown in FIG. 9 or 10, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxBlock™, or Vblock® converged infrastructure commercially available from Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:
    applying, by a communication issue detector, a representation of an audio signal associated with a communication to:
    (i) a trigger word analysis module that determines if one or more trigger words are detected in the audio signal from the audio signal using a trained trigger word detection model that is trained using (a) a set of trigger words indicative of a technical device issue with one or more devices associated with the communication and (b) contextual information comprising one or more of a nearby additional trigger word feature, a time-in-meeting of trigger word feature and a before/after silence pattern feature, relative to a user-provided feedback score; and
    (ii) an audio activity pattern analysis module that determines if a silence pattern anomaly is detected in the audio signal using a trained audio activity model, wherein the audio activity pattern analysis module evaluates a length of an audio activity portion of the audio signal relative to a length of a silence portion of the audio signal to identify the silence pattern anomaly, wherein the silence pattern anomaly is indicative of a technical device issue with one or more devices associated with the communication;
    combining results of the trigger word analysis module and the audio activity pattern analysis module to identify a communication issue for the communication; and
    implementing one or more remedial actions responsive to the identification of the communication issue;
    wherein the method is performed by at least one processing device comprising a processor coupled to a memory.

2. The method of claim 1, wherein the representation of the audio signal comprises one or more spectrograms associated with the communication.

3. The method of claim 1, wherein the applying the audio signal to the trigger word analysis module further comprises evaluating a relevance score generated by the trained trigger word detection model.

4. The method of claim 1, wherein the trained trigger word detection model is further trained using a plurality of additional words and a plurality of background samples.

5. The method of claim 1, wherein the combining employs an ensemble model that combines the results to identify the communication issue for the communication.

6. The method of claim 1, wherein the combining evaluates an accuracy of the trigger word analysis module and the audio activity pattern analysis module to combine the results.

7. The method of claim 1, further comprising applying the representation of the audio signal associated with a communication to a communication application analysis module that evaluates one or more features provided by a communication application relative to one or more thresholds, wherein the communication application is provided by a different provider than a provider of the communication issue detector.

8. The method of claim 7, wherein the features provided by the communication application comprise one or more of an audio device not found feature, a number of screen share sessions feature, a number of connection attempts feature and a poor connection events feature.

9. An apparatus comprising:
at least one processing device comprising a processor coupled to a memory;
the at least one processing device being configured to implement the following steps:
applying, by a communication issue detector, a representation of an audio signal associated with a communication to:
(i) a trigger word analysis module that determines if one or more trigger words are detected in the audio signal from the audio signal using a trained trigger word detection model that is trained using (a) a set of trigger words indicative of a technical device issue with one or more devices associated with the communication and (b) contextual information comprising one or more of a nearby additional trigger word feature, a time-in-meeting of trigger word feature and a before/after silence pattern feature, relative to a user-provided feedback score; and
(ii) an audio activity pattern analysis module that determines if a silence pattern anomaly is detected in the audio signal using a trained audio activity model, wherein the audio activity pattern analysis module evaluates a length of an audio activity portion of the audio signal relative to a length of a silence portion of the audio signal to identify the silence pattern anomaly, wherein the silence pattern anomaly is indicative of a technical device issue with one or more devices associated with the communication;
combining results of the trigger word analysis module and the audio activity pattern analysis module to identify a communication issue for the communication; and
implementing one or more remedial actions responsive to the identification of the communication issue.

10. The apparatus of claim 9, wherein the applying the audio signal to the trigger word analysis module further comprises evaluating a relevance score generated by the trained trigger word detection model.

11. The apparatus of claim 9, wherein the trained trigger word detection model is trained using a set of trigger words, a plurality of additional words and a plurality of background samples.

12. The apparatus of claim 9, wherein the combining employs an ensemble model that combines the results to identify the communication issue for the communication.

13. The apparatus of claim 9, wherein the combining evaluates an accuracy of the trigger word analysis module and the audio activity pattern analysis module to combine the results.

14. The apparatus of claim 9, wherein the representation of the audio signal comprises one or more spectrograms associated with the communication.

15. The apparatus of claim 9, further comprising applying the representation of the audio signal associated with a communication to a communication application analysis module that evaluates one or more features provided by a communication application relative to one or more thresholds, wherein the communication application is provided by a different provider than a provider of the communication issue detector.

16. A non-transitory processor-readable storage medium having stored therein program code of one or more software programs, wherein the program code when executed by at least one processing device causes the at least one processing device to perform the following steps:
applying, by a communication issue detector, a representation of an audio signal associated with a communication to:
(i) a trigger word analysis module that determines if one or more trigger words are detected in the audio signal from the audio signal using a trained trigger word detection model that is trained using (a) a set of trigger words indicative of a technical device issue with one or more devices associated with the communication and (b) contextual information comprising one or more of a nearby additional trigger word feature, a time-in-meeting of trigger word feature and a before/after silence pattern feature, relative to a user-provided feedback score; and
(ii) an audio activity pattern analysis module that determines if a silence pattern anomaly is detected in the audio signal using a trained audio activity model, wherein the audio activity pattern analysis module evaluates a length of an audio activity portion of the audio signal relative to a length of a silence portion of the audio signal to identify the silence pattern anomaly, wherein the silence pattern anomaly is indicative of a technical device issue with one or more devices associated with the communication;
combining results of the trigger word analysis module and the audio activity pattern analysis module to identify a communication issue for the communication; and
implementing one or more remedial actions responsive to the identification of the communication issue.

17. The non-transitory processor-readable storage medium of claim 16, wherein the applying the audio signal to the trigger word analysis module further comprises evaluating a relevance score generated by the trained trigger word detection model.

18. The non-transitory processor-readable storage medium of claim 16, wherein the combining employs an ensemble model that combines the results to identify the communication issue for the communication.

19. The non-transitory processor-readable storage medium of claim 16, wherein the combining evaluates an accuracy of the trigger word analysis module and the audio activity pattern analysis module to combine the results.

20. The non-transitory processor-readable storage medium of claim 16, further comprising applying the representation of the audio signal associated with a communication to a communication application analysis module that evaluates one or more features provided by a communication application relative to one or more thresholds, wherein the communication application is provided by a different provider than a provider of the communication issue detector.

\* \* \* \* \*